W. H. SUMBLING.
REVERSING GEAR FOR POWER DRIVEN MACHINES.
APPLICATION FILED MAR. 12, 1917.

1,259,056.

Patented Mar. 12, 1918.
3 SHEETS—SHEET 1.

Inventor.
W. H. Sumbling
by Egerton R. Case
atty.

UNITED STATES PATENT OFFICE.

WILLIAM HENRY SUMBLING, OF TORONTO, ONTARIO, CANADA.

REVERSING-GEAR FOR POWER-DRIVEN MACHINES.

1,259,056.      Specification of Letters Patent.      Patented Mar. 12, 1918.

Application filed March 12, 1917. Serial No. 154,274.

*To all whom it may concern:*

Be it known that I, WILLIAM HENRY SUMBLING, a subject of the King of Great Britain, residing in the city of Toronto, county of York, Province of Ontario, Canada, machinist, having invented certain new and useful Improvements in Reversing-Gear for Power-Driven Machines, do hereby declare that the following is a full, clear, and exact description of the same.

My invention relates to improvements in reversing gear for power-driven machines, but is more particularly designed to be used in connection with laundry machinery, such as washing and ironing machines, and the objects of my invention are:

First. To prevent certain rotating elements moving in opposite directions having their bearing surfaces in contact, thus enabling me to secure increased efficiency in lubrication, and to reduce wear. Second. To reduce the overhang of the driving and reversing mechanism since as this mechanism is usually carried by one end of the casing inclosing the cylinder, its weight has a tendency to cause a sag in the said end of the said casing. I prevent this sag by reducing the overhang. Third. To provide a driving and reversing gear with which it is necessary to use only one belt, thereby enabling me to place on the market a reversing gear which can be installed in private homes, as well as in the ordinary laundry establishments. Fourth. To provide my reversing gear, in its preferred form, with means whereby the revolutions of the washing cylinder may be changed at will, and without the necessity of having to stop the mechanism. Fifth. To mount the belt-shifting mechanism proper so that it can be placed to extend away from the drive pulleys toward the front of the machine, thus making it safer and more convenient to the operator to manipulate the same: so positioning the said mechanism enables the operator to control the movements of his washing cylinder, without danger of stepping into the gutter, thus assisting in maintaining cleanliness. Sixth. To reduce to a minimum loosening of the pinions and pulleys on their shafts, now common in this class of machinery where the reversing of the cylinder is very frequent. Further objects of my invention will appear from time to time in the following specification wherein I shall describe the preferred construction of my invention, and an alternative construction of a certain part thereof. The parts I claim as new will be pointed out in the claims forming part of this specification.

Figure 1:
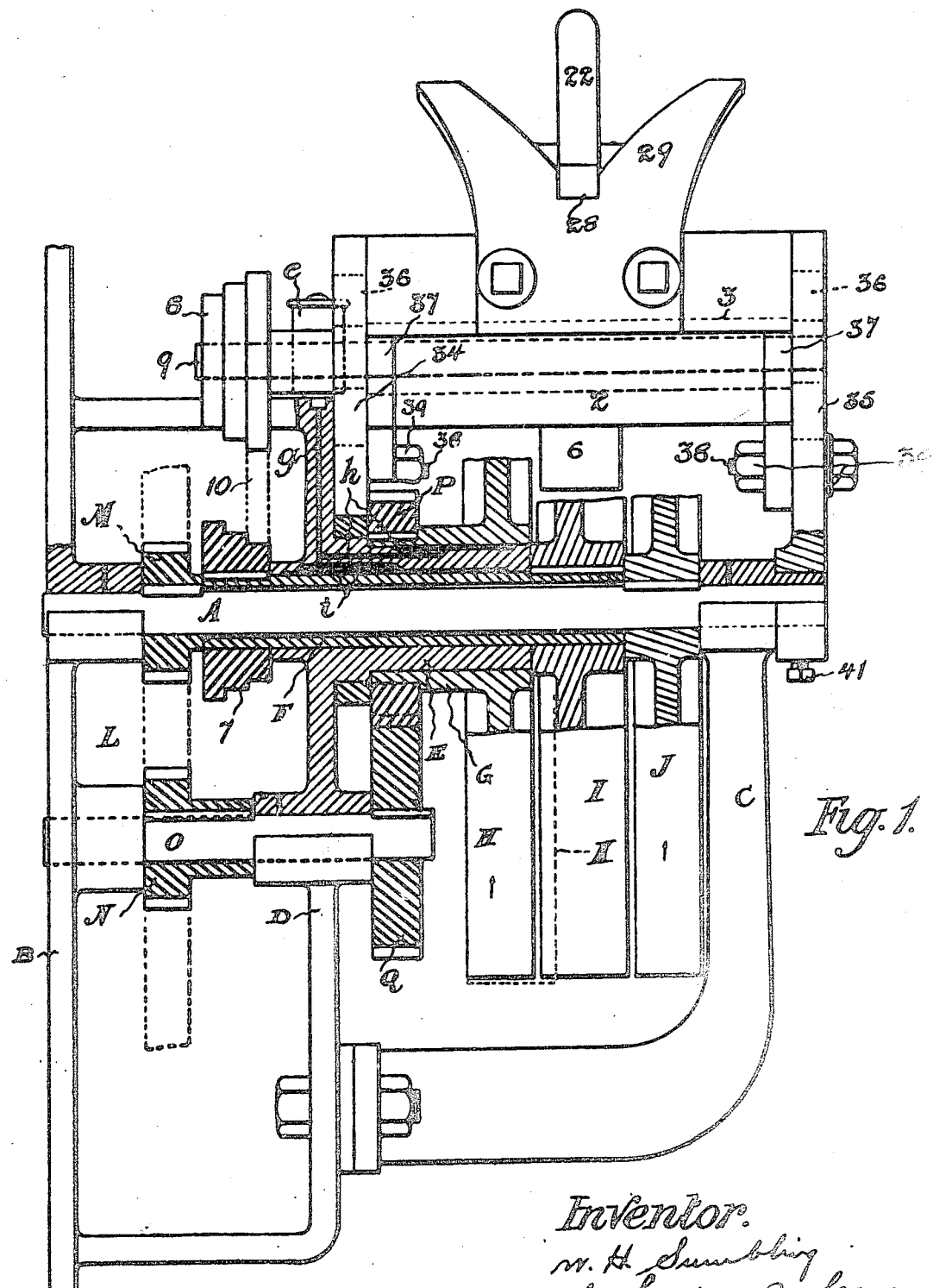
Figures 2, 6:
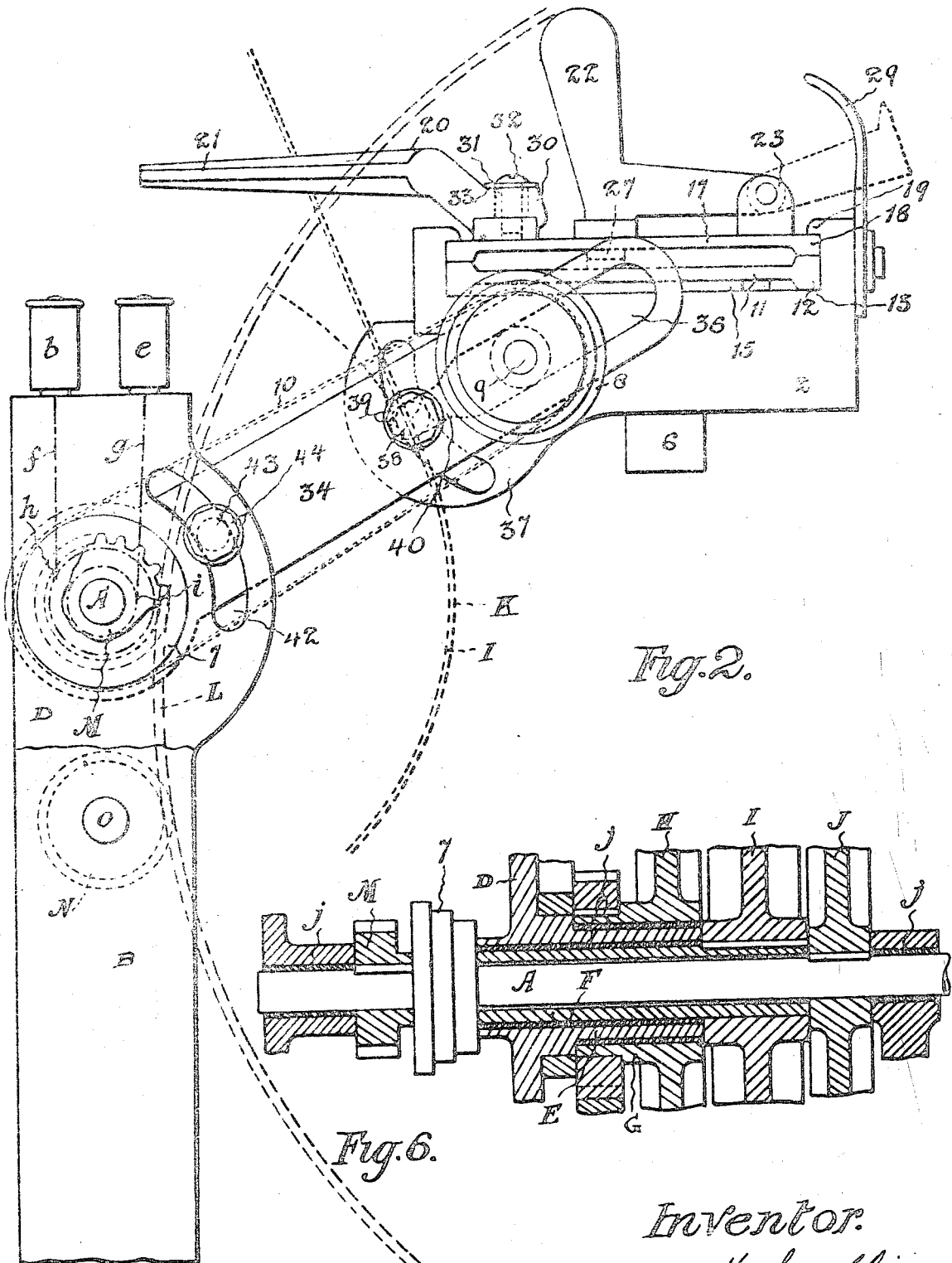
Figure 3:
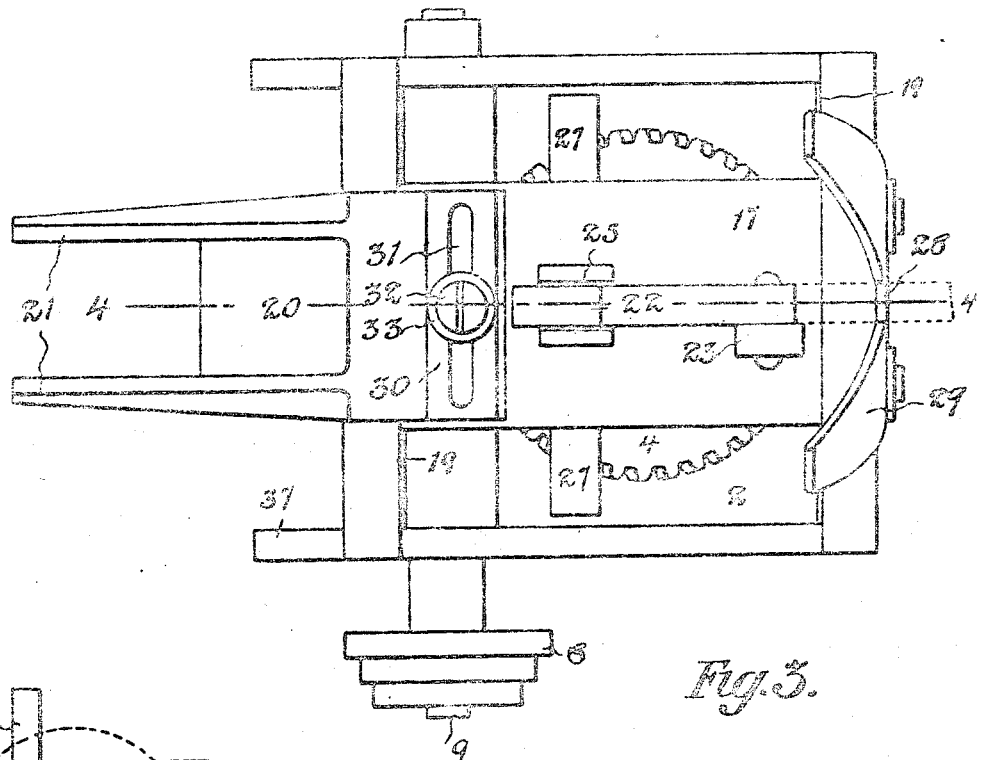
Figure 5:
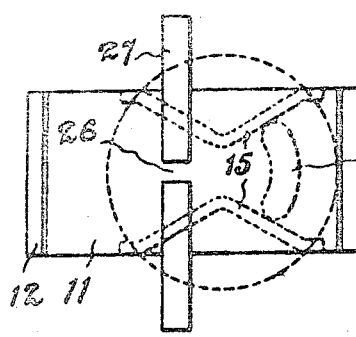
Figure 4:
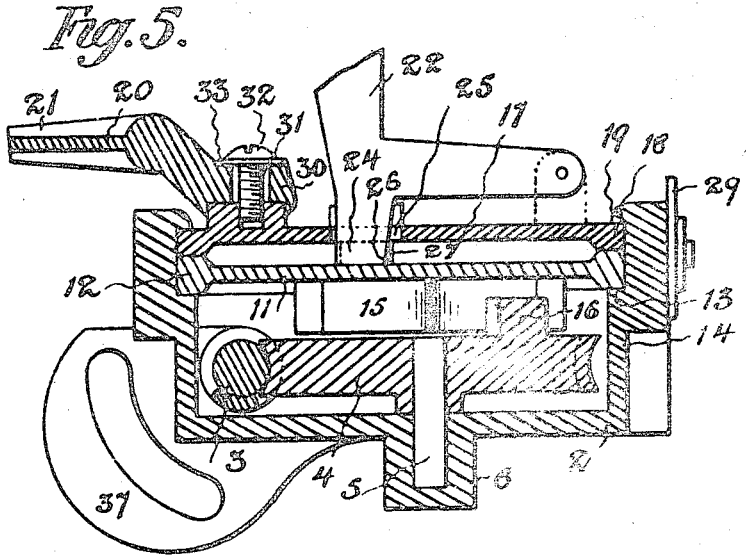

Figure 1 is, in part, a longitudinal section through the driving mechanism, certain parts of the belt-shifting mechanism being shown in end elevation. Fig. 2 is a side elevation of certain of the parts illustrated in Fig. 1. Fig. 3 is a plan elevation of the belt-shifting mechanism. Fig. 4 is a vertical longitudinal section on the line 4—4, Fig. 3. Fig. 5 is a plan elevation of certain of the parts of the belt-shifting mechanism, and Fig. 6 is a central longitudinal section through the main bearings of the driving parts of my mechanism, showing an alternative means of lubrication.

In the drawings, the same characters of reference refer to the same parts.

It is well known that in the class of machinery for use with which I have particularly designed my invention, no convenient and simple means has heretofore been designed whereby in the one machine, and without stopping the mechanism, the cylinder may be caused to rotate in opposite directions, a different number of revolutions, and the result is that the said washing machines cannot be used to the best advantage in washing large, as well as small articles. Furthermore, it is well known that in washing small goods such as collars and cuffs, the cylinder needs to be reversed less frequently than when washing large articles such as blankets and sheets. Where a machine is confined to the washing of small articles, it will not wear itself out as readily as when it is used to wash large articles for the simple reason that in washing large articles, to prevent the clothes from becoming knotted up, the cylinder must be turned in opposite directions the same number of times. Each time the cylinder is reversed, the machine is put under considerable strain, with result that the keys, coupling the pinions and pulleys to the various shafts, in due time become loosened, necessitating the closing down for repairs. It will therefore be understood readily by one skilled in this art that a reversing gear to be applied to washing machines and which is constructed to be elastic in respect of the number of revolutions given the cylinder in both directions, will possess peculiar advantages. In washing large goods the cylinder should be reversed every three revolutions. Now in washing small goods in a cylinder which can only be rotated in opposite directions, a fixed few number of times, unnecessary strains are brought into action against the operating mechanism resulting in the deterioration of the machine. Where the reversing gear can be adjusted to increase the number of revolutions of the cylinder in either direction, when washing small articles, considerable saving is effected.

In connection with my reversing gear, it will be noticed that it is only necessary to use one drive-belt, thereby dispensing with the twisted belt now necessarily used in this class of apparatus. The disadvantages accruing from the use of two belts are manifold. Not only does the use of two belts in laundry machines necessitate rather skilled attention on the part of the operator, but the twisted belt collects more or less dirt, and this dirt is scraped from the belt, through its action, and oftentimes falling into the cylinder and dirtying the clothes. No two belts stretch alike, and consequently it has been found that in connection with the old style of reversing gear, the cylinder will be turned around a greater number of times in one direction than in the reverse direction, resulting in the imperfect washing of the clothes. Furthermore, such unequal revolution has a tendency to knot large articles. It will be clear that where articles are not knotted up, they can be more easily removed from the mass in the cylinder without danger of being torn.

By being able to regulate to a nicety the number of revolutions in either direction given the cylinder, a considerable saving in time will be effected in washing clothes.

In placing on the market a washing machine which is designed to be placed in household laundries, it will be clear that a very great advantage will result from the use of only one driving belt. The average private user of power-driven washing machines must have some machine that requires no expert attention, and yet one that will satisfactorily wash the clothes. By dispensing with the cross belt, one of the main features that have militated against the successful adoption of power driving washing machines in private homes, has been eliminated.

At the outset it must be understood that although I prefer to use the type of belt-shifting mechanism disclosed in this specification and the drawings forming part thereof, it must be understood that I do not confine myself to necessarily using the same, as any suitable type of belt-shifting mechanism may be used.

Furthermore, it will be understood that I may make use of my reversing gear to drive the cylinder at one or both ends.

A is the shaft of the reversing gear which has bearing in the uprights B and C of any suitable frame which is designed to be secured to the outside casing, (not shown), in which is mounted a cylinder (not shown). Forming part of said frame is an upright D provided with a hub E. Mounted to have bearing in the hub E is a sleeve F, which has an internal bore of greater diameter than the external diameter of the shaft A, thereby providing clearance between these parts. Mounted to have bearing on the hub E is the hub G of the pulley H. Keyed to the sleeve F is the pulley I, and keyed to the shaft A is the pulley J. The pulley I is placed intermediate the pulleys H and J, and is wider than either of these two pulleys. K is the drive belt which receives power from any suitable source, and the said belt K is substantially of the same width as the pulley I so that whether it be operating over the pulley H, or the pulley J, it will overlap the pulley I sufficiently to drive this pulley. The dotted arcs L (see Figs. 1 and 2), represent the gearing attached to the cylinder (not shown), and meshing with the said gearing L are two pinions M and N. The pinion M is keyed to the shaft A, and the pinion N is keyed to the shaft O which has bearing in the uprights E and D. Keyed to the hub G of the pulley H is a pinion P which meshes with the pinion Q keyed to the shaft O. If the pulley H be rotating in the direction indicated by arrow in Fig. 1, it will be understood that the pinion N would move the gearing L in one direction. In order to move the gearing L in the opposite direction, the belt K must operate the pulley J in the direction indicated by arrow in Fig. 1 so as to cause the pinion M to reverse the direction of rotation of the gearing L. I shall now describe the means for shifting the belt K. The preferred type of belt-shifting mechanism comprises a suitable box 2 in which is suitably journaled the worm 3. This worm is in mesh with the worm wheel 4, keyed to the pin 5, which operates in the step-bearing 6. Energy is transmitted from the shaft A to the worm 3 after any suitable manner. One suitable construction for this purpose comprises a step pulley 7 keyed to the sleeve F and a step pulley 8 keyed to the worm shaft 9. A belt 10 co-acts with these pulleys. By means of the pulleys just described, I can secure various timed reversals for the cylinder (not shown), as before elaborated. I do not confine myself necessarily to using the type of transmission gear just mentioned, because I may use any suitable type of transmission gear at this point which will give a substantially fixed number of revolutions of the cylinder (not shown) in either direction.

11 is a plate, the ends 12 of which operate on the flanges 13 formed in the ends 14 of the box 2. Depending from the said plate are the rib-cams 15 of a well-known shape, spaced apart as shown particularly in dotted lines in Fig. 5, and operating between said rib-cams is a cam 16 carried by the worm wheel 4. The cam 16 co-acts with the rib-cams 15 in a well-known manner to reciprocate the plate 11 on the flanges 13. 17 is a plate, the ends 18 of which operate upon the ends 12 of the plate 11 and underneath the flanges 19 forming part of the box 2. Adjustably carried by the plate 17 is the fork 20 between the prongs 21 of which operates the belt K. By any suitable means the plate 17 is coupled to the plate 11 so that the reciprocating movement of the plate 11 will be transferred to the plate 17, so as to shift the fork 20 to move the belt K alternately onto the pulleys H and J, so as to actuate the reversing gear for the purpose set forth. The preferred means for coupling the plate 17 to the plate 11 comprises an arm 22 which is pivoted to the lug 23, carried by the plate 17. This arm is provided with a spur 24, which normally extends through a slot 25 formed in the plate 17, and into a space 26 formed between the bars 27, carried by the plate 11. The bottom of the spur 24 rests upon the top of the plate 11.

It will be observed particularly from Fig. 1, that so long as the belt K is in movement, the pulley I will be rotated with the result that the worm 3 and worm wheel 4 will always be in operation. When it is desired to bring the cylinder (not shown) to rest, the arm 22 is moved into the dotted position illustrated in Figs. 2 and 3, where it finally rests in the slot 28 formed in the forked rest 29, carried by the box 2. While the said arm 22 is held in the said slot, it will be self-evident that since the center of the fork 20 is in alinement with the center of the pulley I, the belt K will be held on said pulley and out of contact with both of the pulleys H and J. It will be understood that the plate 11 keeps reciprocating so long as the worm 3 is in action, and when it is desired to start the fork 20 into action, the arm 22 will be thrown into the position illustrated by full lines in Figs. 2 and 4. So soon as the space 26 arrives underneath the spur 24, this spur will drop down into said space, and so start the reciprocation of the plate 17. When the arm 22 is first thrown down as described, it will ride upon either of the bars 27 until finally its spur passes into the space 26.

In order to allow for the adjusting of the fork 20, in respect of the pulley I, the base 30 of said fork is longitudinally slotted as shown in 31, and held in this slot is the set screw 32, which screws into the plate 17, or a reinforced portion thereof. 33 is a washer for the set screw 32.

The construction just described provides a very compact belt-shifting mechanism, and by constructing the same distinct from the reversing gear, I am enabled to reduce the overhang of my mechanism, as before mentioned.

The belt-shifting mechanism may be supported by any suitable means, as by the frame supporting the shaft A and other parts. The preferred means comprises two arms 34 and 35, the upper ends of which are slotted as shown at 36. Where the worm shaft 9 extends through the slots 36, it is enlarged to fit the same, as shown by dotted lines in Fig. 2. The box 2 is provided with slotted brackets 37, through which extend the threaded bolts 38, provided with the nuts and washers designated by the common numeral of reference 39. The bolts 38 pass through and fit the narrowed ends 40 of the slots 36. The construction just described enables me to secure horizontal adjustment of the box 2. The arm 35 is mounted on one end of the upright C and is secured in adjusted position by any suitable means such as a set-screw 41. The arm 34 is preferably mounted on the hub E, and passing through the slot 42 formed in the upright D, and through a hole formed in said arm 34 is a threaded bolt 43 provided with nuts and washers designated by the common numeral of reference 44. The construction just described enables me to secure the arm 34 firmly in adjusted position to properly support the belt-shifting mechanism. By means of the slots 36 formed in the arms 34 and 35, and the brackets 37 and their associated parts, I am enabled to shift the step pulley 8 so as to adjust the belt 10 in respect of proper tension.

As before mentioned, one of the most important objects of my invention is to prevent the various rotating parts in the reversing gear being in contact. It is well known that it is difficult to oil bearings which are in contact and rotating in opposite directions. To overcome this difficulty and to facilitate the oiling of certain important bearings, it will be observed that the shaft A is held in bearings only at its ends, and that by reason of the clearance between the sleeve F and the said shaft, these parts may rotate in opposite directions, in other words pulleys I and 7, in respect of the shaft A, without their bearing surfaces touching. The sleeve F has bearing in the hub E which is stationary, and the hub G of the pulley H, as well as the pinion P, have bearing on the outer side of the hub E. This means that the hub G and sleeve F will never come in contact.

In order to oil the bearings just described, I use this preferred construction: $b$ and $e$ are a pair of oil or grease cups carried by the upright D, and these communicate through the channels $f$ and $g$, with the passage ways $h$ and $i$ formed in the hub E. The bearings for the shafts A and O may be oiled after the usual manner as illustrated in Fig. 1.

As before mentioned, one of the important features of my invention is the proper oiling of the rotating parts carried by the shaft A while in movement. I may effect this after the manner illustrated in Fig. 1, or after the manner illustrated in Fig. 6. In Fig. 6 I omit the oil ducts or passage-ways and interpose between the various rotating surfaces, bushings $j$ made of any suitable non-metallic material which is self-oiling. There is on the market a suitable material for this purpose known as "Arguto," and the manufacturers thereof declare that bearings supplied with the same will be kept self-oiled for a number of years.

Since I only use one belt, and this belt is wider than those used in machines using two belts, it will be understood that the belt of my machine will be looser than where two belts are used, as the traction is greater. The result is that there will be less wear and tear on the belt as well as on the machine.

While I have described what I consider to be the best embodiments of my invention, I desire it to be understood that the principle can be embodied in different forms, and I desire not to be limited beyond the requirements of the prior art, and the terms of my claims.

While I prefer to make the relative widths of the pulleys H, I, and J as mentioned, still I claim it as falling within the scope of my claims, the use of three pulleys of substantially the same width. I can use these pulleys of the same width provided I adjust a certain part of the belt-shifting mechanism so that the belt K will always be in contact with the central pulley.

By one skilled in this art, it will be understood that the step-pulleys 7 and 8 or their equivalents can be used in the combination of parts shown in Fig. 1, particularly without necessarily providing the clearance between the sleeve F and the shaft A.

Claims:

1. In a reversing gear, the combination of a driven shaft; a suitable frame in which said driven shaft has bearing at each end; a bearing-hub carried by said frame and positioned between the bearings for said shaft, and through which said shaft passes; a pulley coupled to said shaft; a sleeve journaled in said hub; a pinion coupled to said shaft beyond one end of said sleeve; a pulley coupled to said sleeve adjacent the pulley coupled to said shaft; a pulley journaled on said hub and adjacent the pulley coupled to said sleeve, and a pinion carried by said third pulley.

2. In a reversing gear, the combination of a driven shaft; a suitable frame in which said driven shaft has bearing at each end; a bearing hub carried by said frame and positioned between the bearings for said shaft, and through which said shaft passes; a pulley coupled to said shaft; a sleeve journaled in said hub and having a bore of greater diameter than the external diameter of said shaft; a pinion coupled to said shaft beyond one end of said sleeve; a pulley coupled to said sleeve adjacent the pulley coupled to said shaft; a pulley journaled on said hub and adjacent the pulley coupled to said sleeve, and a pinion carried by said third pulley.

3. In a reversing gear, the combination of a driven shaft; a suitable frame in which said driven shaft has bearing at each end; a bearing-hub carried by said frame and positioned between the bearings for said shaft, and through which said shaft passes; a pulley coupled to said shaft; a sleeve journaled in said hub and having a bore of greater diameter than the external diameter of said shaft; a transmission-gear element secured to one end of said sleeve; a pinion coupled to said shaft beyond one end of said sleeve and adjacent said transmission-gear element; a pulley coupled to said sleeve adjacent the pulley coupled to said shaft; a pulley journaled on said hub and adjacent the pulley coupled to said sleeve, and a pinion carried by said third pulley.

4. In a reversing gear, the combination of a driven shaft; a suitable frame in which said driven shaft has bearing at each end; a bearing-hub carried by said frame and positioned between the bearings for said shaft, and through which said shaft passes; a pulley coupled to said shaft; a sleeve journaled in said hub and having a bore of greater diameter than the external diameter of said shaft; a transmission-gear element secured to one end of said sleeve; a pinion coupled to said shaft beyond one end of said sleeve and adjacent said transmission-gear element; a pulley coupled to said sleeve adjacent the pulley coupled to said shaft; a pulley journaled on said hub and adjacent the pulley coupled to said sleeve; a pinion carried by said third pulley; a countershaft journaled in said frame beneath said driven shaft; a pinion coupled to said countershaft and in mesh with the pinion coupled to said third pulley; and another pinion coupled to said countershaft and positioned in alinement with the pinion coupled to said driven shaft.

5. The combination with a reversing-gear comprising the combination of a driven shaft; a suitable frame in which said driven shaft has bearing at each end; a bearing-hub carried by said frame and positioned between the bearings for said shaft, and through which said shaft passes; a pulley coupled to said shaft; a sleeve journaled in said hub and having a bore of greater diameter than the external diameter of said shaft; a variable speed transmission-gear element secured to one end of said sleeve; a pinion coupled to said shaft beyond one end of said sleeve and adjacent said transmission-gear element; a pulley coupled to said sleeve adjacent the pulley coupled to said shaft; a pulley journaled on said hub and adjacent the pulley coupled to said sleeve, and a pinion carried by said third pulley; of a belt-shifting mechanism comprising a suitable support; means whereby said support is suitably positioned in respect of said reversing gear; a pair of plates mounted in said support to have reciprocating movement therein; a shaft journaled in said support; a variable speed transmission-gear element carried by said shaft and in alinement with the first-mentioned transmission-gear elements; means whereby energy is transmitted from said second-mentioned shaft to reciprocate said plates; a belt-shifting fork carried by one of said plates, and means whereby the plate, provided with said fork, can be coupled to and uncoupled from the other plate.

6. A reversing gear comprising a suitable frame composed of three standards, one of which is provided with a hub having grooves formed therein for lubricating purposes opening into the bore and to the outer surface thereof, which grooves are in communication with vertical passage ways formed in said intermediate standard; a shaft journaled at each end in said outer standards and passing through the said hub; a pulley keyed to said shaft; a pinion also keyed to said shaft and spaced apart from said pulley; a sleeve surrounding said shaft and having a bore of greater diameter than said shaft and having bearing in said hub; a pulley keyed to said sleeve and positioned adjacent said first-mentioned pulley; a pulley journaled on said hub and positioned so as to place said second-mentioned pulley between it and said first-mentioned pulley; and a pinion coupled to said third-mentioned pulley.

7. A belt-shifting mechanism comprising a suitable support; a pair of plates horizontally mounted to reciprocate in said support, one above the other; means mounted within said support and co-acting with the lower of said plates to reciprocate the same; means carried by the upper of said plates whereby said upper plate may be coupled to, and uncoupled from, said lower plate, and means carried by said upper plate to bring pressure laterally against a belt.

8. A belt-shifting mechanism comprising a suitable support; a pair of plates horizontally mounted to reciprocate in said support one above the other; means mounted within said support to co-act with the lower of said plates to reciprocate the same; a pair of bars carried by said lower plate and operating underneath said upper plate, the said bars being placed in alinement and spaced apart, and substantially in the middle of said lower plate, and projecting beyond each side of said plate; an arm pivoted to said upper plate and provided with a spur which normally extends through a slot formed in said upper plate and into the space between the inner ends of said bars, so as to couple said plates together, and a device adjustably carried by said upper plate and projecting beyond one end of said support and whereby pressure is laterally brought against a belt to shift it.

9. A reversing gear comprising the combination of a driven shaft; suitable standards in which said driven shaft has bearing; a pulley coupled to said shaft; a pinion coupled to said shaft; a sleeve surrounding said shaft and having a bore of greater diameter than the external diameter of said shaft; a pulley coupled to said sleeve; a standard provided with a hub in which said sleeve is journaled; a pulley journaled on said hub in such position that said second-mentioned pulley will be positioned between it and said first-mentioned pulley.

In testimony whereof I affix my signature in presence of two witnesses.

WILLIAM HENRY SUMBLING.

Witnesses:
E. R. CASE,
B. D. ROSEBATCH.